United States Patent

Prete, Jr. et al.

[11] 3,866,272
[45] Feb. 18, 1975

[54] STRAP TENSIONING BUCKLE

[75] Inventors: Ernest Prete, Jr., Woodland Hills; Howard T. Knox, Hawthorne, both of Calif.

[73] Assignee: Ancra Corporation, El Segundo, Calif.

[22] Filed: May 20, 1974

[21] Appl. No.: 471,802

[52] U.S. Cl. .............................. 24/68 CD, 248/361
[51] Int. Cl. ............................................. A43c 11/00
[58] Field of Search ............ 24/68 R, 68 SB, 68 CD, 24/68 D, 68 E, 71 R, 71 ST, 71 TD, 71.2, 71.3, 191, 193, 163 A, 170, 171, 69 ST, 69 CT, 69 SB, 198

[56] References Cited
UNITED STATES PATENTS

| | | | |
|---|---|---|---|
| 2,997,761 | 8/1961 | Davis | 24/68 E |
| 3,050,799 | 8/1962 | Davis | 24/68 CD |
| 3,099,055 | 7/1963 | Huber | 24/68 CD |
| 3,423,799 | 1/1969 | Higuchi | 24/68 CD |

FOREIGN PATENTS OR APPLICATIONS

| | | | |
|---|---|---|---|
| 579,154 | 7/1958 | Italy | 24/68 CD |

Primary Examiner—Geo. V. Larkin
Attorney, Agent, or Firm—Edward A. Sokolski

[57] ABSTRACT

A frame is formed with a pair of spaced apart side plates which are joined together by cross bars which form a web structure between the plates. A handle member is supported on the side plates for pivotal motion relative thereto. The handle member has a latch bar slidably mounted thereon, this latch bar being resiliently held in a latching position by means of a spring. A strap to be tensioned is wrapped between the cross bars of the frame web structure and around the handle and is held in the tensioned position when the handle is nested between the side plates with the latch bar in mating engagement with a pair of hook members at the end of the side plates. The latch bar is released from its latched position by the application of inward pressure thereto which may be applied by lifting up on the strap.

9 Claims, 5 Drawing Figures

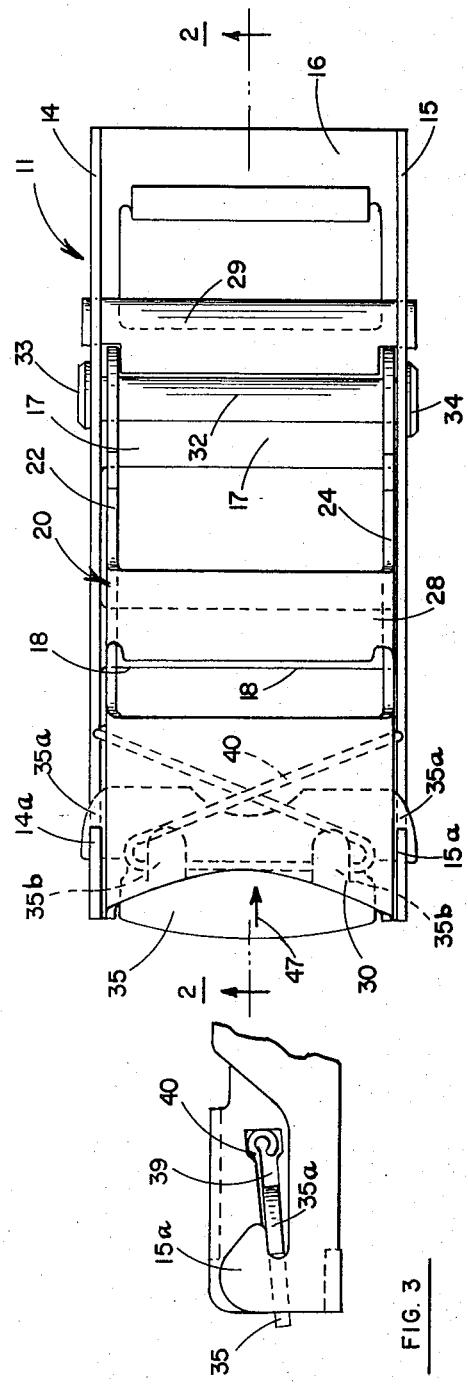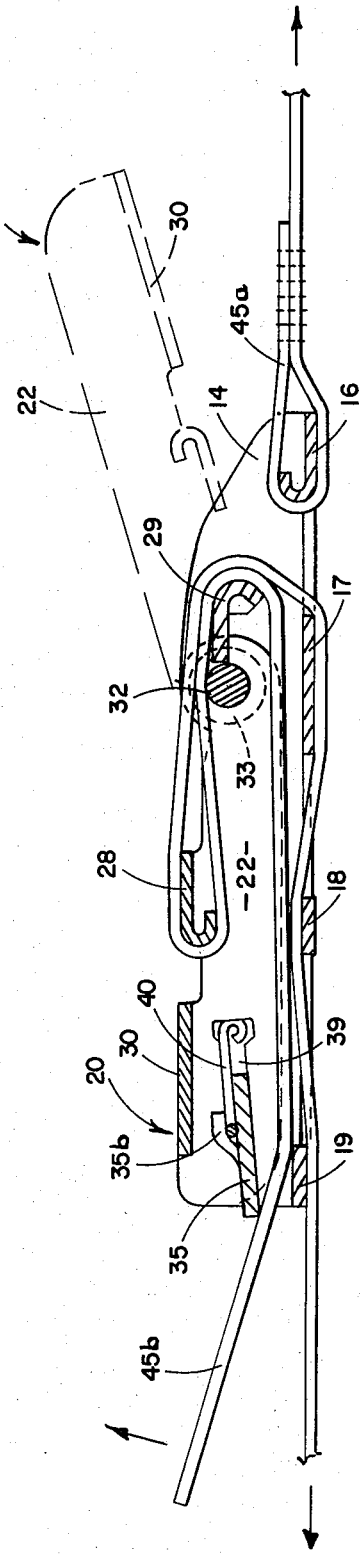

STRAP TENSIONING BUCKLE

This invention relates to strap tensioning buckles and more particularly to such a device suitable for use in tying down cargo.

In the handling of cargo, it is desirable to have means for rapidly tying down the cargo which will hold it firmly in place during transportation, and which can be rapidly and easily released when the cargo is to be removed. Strap tensioning buckles have come into widespread use for cargo tie-down in view of their ability to well satisfy the aforementioned requirements. Certain strap tensioning buckles of the prior art provide a tensioning action but do not provide a locking or latching of the buckle in its tensioned position. The lack of such positive locking action presents a greater possibility of the device being inadvertently released to the non-tensioned position. Certain other strap tensioning buckles of the prior art, which utilize positive latching mechanisms to hold them in the tensioned position, have their latching mechanisms so designed and positioned that they must be manually actuated in a manner such as to present a hazard to operating personnel, i.e., when the strap is highly tensioned, its release results in a high force movement of the handle which could cause injury to the operator and damage to the cargo.

The present invention overcomes the shortcomings of the prior art in providing a buckle which is held in the tensioned position by a firmly retaining latching mechanism, this latching mechanism being releasable only by a positive actuation. This latching mechanism is designed so that it is operable with minimum hazard to the operator under high tensioning conditions, particularly in view of the fact that such actuation can be accomplished by lifting up on the strap without any direct manual contact with the mechanism. This end result is achieved with a simple and economical design which lends itself to compactness.

It is therefore an object of this invention to provide an improved strap tensioning buckle which is positively latched in the tensioning position.

It is a further object of this invention to provide a strap tensioning buckle which can more safely be released under high tensioning conditions.

Other objects of this invention will become apparent as the description proceeds in connection with the accompanying drawings, of which:

FIG. 1 is a top plan view of a preferred embodiment of the invention;

FIG. 2 is a cross sectional view taken along the plane indicated by 2—2 in FIG. 1;

FIG. 3 is a side elevational view illustrating the latching mechanism of the preferred embodiment;

Figure 4:
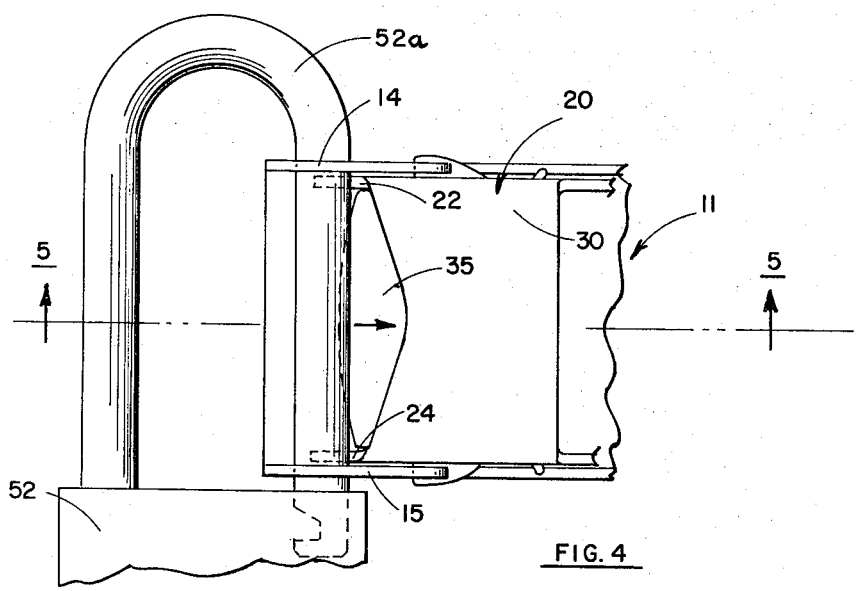
Figure 5:
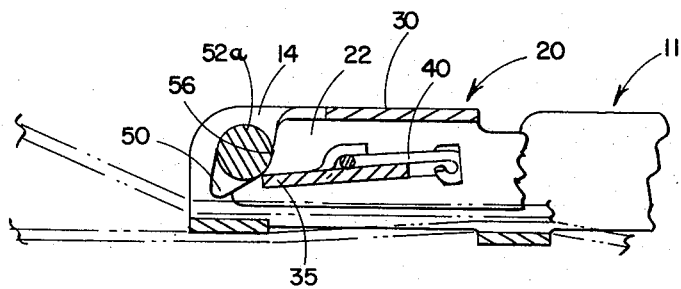

FIG. 4 is a partial top plan view of a modified version of the preferred embodiment; and FIG. 5 is a cross sectional view taken along the plane indicated by 5—5 in FIG. 4, Briefly described, the device of the invention is as follows: A frame is formed from a pair of spaced apart side plates joined together at one edge by cross bars, the cross bars forming a web structure. A handle member is pivotally supported between the side plates for rotatable movement from a position nested between the frame side plates to positions away from such side plates. The handle may be formed as the frame with a pair of spaced apart side plate members which are joined together at one edge by cross bars.

The handle member has a spring urged latch bar slidably mounted therein which is adapted to matingly engage hook portions at the end of the frame side plates in the nested (latched) position. The strap to be tensioned is wrapped between the cross bars of the frame and around the handle such that tensioning action is applied thereto with the handle in the latched position. The buckle is released from the latched position by inwardly actuating the latch bar either by the application of finger pressure directly thereto or by lifting upwardly on the strap which abuts against the latch bar. Referring now to FIGS. 1–3, a preferred embodiment of the invention is illustrated. In FIGS. 1 and 3, for convenience of illustration, the strap is not shown. Frame member 11 is formed by a pair of spaced apart side plates 14 and 15 which are joined together at one of the edges thereof by a plurality of cross bars 16–19, these cross bars forming a web structure. Handle 20 is formed by a pair of side plates 22 and 24 which are joined together at the top edges thereof by cross bar 28 and cross plate 30. Handle 20 is pivotally supported in frame 11 on pin member 32 which is fixedly attached to side plates 14 and 15 by means of rivets 33 and 34, the ends of side plates 22 and 24 having apertures therein through which pin member 32 fits so as to permit rotatable movement of the handle on the pin member.

Slidably mounted in slots 39 formed in side plates 22 and 24 is latch bar 35, the latch bar having ears 35a which ride in the slots. Latch bar 35 is resiliently urged by spring 40 to bring ears 35a into abutment against the edges of slots 39. The opposite ends of spring 40 are placed in slots 39 and abut against the edges thereof, while the central portions of the spring engage tabs 35b of the latch bar. Side plates 14 and 15 of the frame have hooked end portions 14a and 15a respectively, into which the ears 35a of the latch bar fit when the device is in the latched condition. One end 45a of the strap to be tensioned is secured to cross bar 16 of the frame. The other end 45b of the strap is threaded through cross bars 17–19 of the frame and wound around cross bar 29 of the frame and cross bar 28 of the handle.

The handle is shown in the untensioned position by the dotted lines in FIG. 2. As can be seen, when the handle is swung from this position to the latched position as shown in FIGS. 1—3, the strap is tensioned between the handle and the frame with the handle finally being latched to the frame when the latching bar 35 engages the hooked end portions 14a and 15a of the frame side plates. The handle is released from the frame by inwardly depressing latch bar 35 as indicated by arrow 47. This may be accomplished either by direct finger pressure or by lifting upwardly and inwardly on strap 45b in the general manner indicated in FIG. 2. In view of the fact that the latch bar is at the very end of the handle, even with direct finger actuation thereof the hand need not be brought in the swing path of the handle. Of course, by using the strap to actuate the latch bar, even the slightest possibility of the handle striking the operator's hand can be avoided.

Referring now to FIGS. 4 and 5, a variation of the embodiment just described is illustrated. This variation is suitable for use where security measures are required to lock the buckle, such as for example with a padlock or with a locking cable for a number of buckles which is padlocked. Except for the means to be described to enable such padlocking, the buckle is identical in its construction and operation to that just described.

In this version, side bars 14 and 15 of the frame are extended in length and have apertures 50 formed in the very ends thereof. Side plates 22 and 24 of the handle have their end surfaces 56 indented to form stops which abut against the hasp 52a of the lock. Thus, the hasp 52a of lock 52 is placed through apertures 50 in the ends of frame side plates 14 and 15 to lock the buckle in the latched position. Where a whole series of such buckles are utilized, a single cable can be passed through the apertures 50 of each of the buckles, this cable being secured at its ends with a suitable padlock. In this manner, a convenient way of securely locking the buckles is provided.

The device of the invention thus provides a simple and economical strap tensioning buckle which is latched in the tensioned position in a positive manner, and wherein the latching mechanism can be released under highly tensioned conditions without hazard to the operator.

While the invention has been described and illustrated in detail, it is to be clearly understood that this is intended by way of illustration and example only and is not to be taken by way of limitation, the spirit and scope of the invention being limited only by the terms of the following claims.

We claim:

1. A strap tensioning buckle comprising:
    a frame member having a pair of substantially parallel side plates joined together by a plurality of cross bars,
    a handle member pivotally attached to said frame member, said handle member having a pair of substantially parallel side plates joined together by a plurality of cross bars, said handle member being pivotally supported at one end thereof on said frame member,
    a latch bar slidably mounted on said handle member at the end thereof opposite to said pivotally mounted end,
    spring means for resiliently urging said latch bar outwardly away from the central portions of said handle member in a direction parallel to the longitudinal axes of the handle member side plates,
    said frame member side plates having a pair of hook portions located near one end thereof and facing toward the center of the frame member, said latch bar fitting into said hook portions in engagement therewith with said handle in its latched position,
    whereby said handle is released from its latched position by depressing said latch bar inwardly against the tension of said spring to disengage the latch bar from the hook portions.

2. The buckle of claim 1 wherein said latch bar has ears formed on opposite sides thereof which fit into the hook portions of the frame side plates.

3. The buckle of claim 1 wherein said spring has its opposite ends abutting against the frame with the central portion of the spring engaging the latch bar.

4. The buckle of claim 1 wherein said frame member includes a pin fixedly attached thereto, the end portions of the handle member side plates having apertures formed therein through which said pin is fitted, thereby providing pivotal support for said handle member on said pin.

5. The buckle of claim 1 and further including a strap, one end of said strap being fixedly attached to one end of the frame, the other end of said strap being threaded through three of the cross bars of said frame member and wrapped around one of the cross bars of said frame member and one of the cross bars of said handle member, the latch bar being positioned so that when said other end of said strap is lifted upwardly and inwardly, the latch bar is disengaged from the hook portions of the frame member.

6. In a buckle for use in tensioning a strap around articles to be tied down,
    a frame member including a pair of spaced apart substantially parallel side plates, a plurality of cross bars joining said plates together along one of the edges thereof, a cross bar extending between said plates at a position thereon spaced from said one of the edges, and a pin member extending between said plates, and
    a handle member pivotally supported at one end thereof on said pin member, said handle member including a pair of spaced apart substantially parallel side plates, a cross bar extending between said plates, a latch bar slidably mounted in said handle member side plates near the end of said handle member opposite to said one end thereof, and spring means for resiliently urging said latch bar outwardly away from the center of said handle member, said frame member side plates having hook portions formed in one of the ends thereof, said latch bar engaging said hook portions in a latched condition in response to said spring means,
    whereby the handle member can be released from its latched position by depressing the latch bar inwardly to cause disengagement thereof from the hook portions.

7. The buckle of claim 6 wherein one end of the strap is attached to one of said cross bars joining the edges of the frame member side plates and the other end of the strap is wound between the other cross bars joining the edges of the frame member side plates and around the cross bar of the frame member spaced from the edges and around the cross bar of said handle member.

8. The buckle of claim 6 wherein said handle member side plates have apertures formed therein, said pin member fitting through said apertures thereby providing the pivotal support for said handle member.

9. The handle of claim 6 wherein said member side plates have similar oppositely positioned slots formed therein, said latch bar having a pair of ear portions, each of which is slidably mounted in one of said slots.

* * * * *